United States Patent [19]
Brewer

[11] Patent Number: 5,647,412
[45] Date of Patent: Jul. 15, 1997

[54] APPARATUS FOR CONTAINING OIL AND WASTE SPILLAGE AT A LINE CONNECTION

[76] Inventor: Jack G. Brewer, 99 Maple La., Chickasha, Okla. 73018

[21] Appl. No.: 612,375

[22] Filed: Mar. 8, 1996

[51] Int. Cl.⁶ .................. B65B 1/04; B65B 3/04; B67C 3/02
[52] U.S. Cl. .............. 141/86; 220/571; 137/312; 222/108
[58] Field of Search .............. 141/86, 88, 89, 141/311 A; 220/571; 137/312, 313, 314; 184/106; 222/108, 109, 110, 111

[56] References Cited

U.S. PATENT DOCUMENTS

| | | |
|---|---|---|
| 441,141 | 11/1890 | Dalton . |
| 2,438,245 | 3/1948 | Gregg ........................... 60/52 |
| 2,497,969 | 2/1950 | Anderson ................... 137/364 |
| 2,954,797 | 10/1960 | Dryer ......................... 137/312 |
| 3,110,157 | 11/1963 | Radd ............................ 62/49 |
| 3,562,969 | 2/1971 | Little, Jr. .................. 137/383 |
| 3,871,401 | 3/1975 | Lyons ......................... 137/381 |
| 4,819,677 | 4/1989 | Stern ......................... 134/104.2 |
| 4,871,084 | 10/1989 | Robbins ...................... 220/85 F |
| 4,896,705 | 1/1990 | Podgers et al. ................ 141/86 |
| 4,912,966 | 4/1990 | Sharp ........................... 73/49.2 |
| 4,960,346 | 10/1990 | Tamayo ........................ 405/52 |
| 5,002,101 | 3/1991 | McLeod ....................... 141/83 |
| 5,058,633 | 10/1991 | Sharp .......................... 141/86 |
| 5,060,509 | 10/1991 | Webb ......................... 73/40.5 R |
| 5,071,166 | 12/1991 | Marino ....................... 280/830 |
| 5,101,869 | 4/1992 | Myers ........................ 141/339 |
| 5,152,635 | 10/1992 | Ziu ............................ 405/52 |
| 5,313,991 | 5/1994 | Murray et al. ................ 141/86 |
| 5,379,810 | 1/1995 | Marino ......................... 141/10 |
| 5,511,573 | 4/1996 | Corte .......................... 220/571 |

*Primary Examiner*—Henry J. Recla
*Assistant Examiner*—Timothy L. Maust
*Attorney, Agent, or Firm*—James T. Robinson

[57] ABSTRACT

An apparatus comprising a container having a bottom and an upstanding sidewall, wherein the sidewall forms an open top end of the container. The container has opposed sidewall openings for allowing loading and unloading lines to be receivably coupled within the container, wherein any spillage from the ends of the lines and the line connection is retained within the container. A lid is cooperatively received on the container to close the open top end of the container when the unloading line is removed from the apparatus. With the unloading line removed from the container and the lid closed, an extension member attached to the lid covers the sidewall opening that is used for receiving the unloading line within the container.

20 Claims, 5 Drawing Sheets

APPARATUS FOR CONTAINING OIL AND WASTE SPILLAGE AT A LINE CONNECTION

BACKGROUND

The present invention relates generally to containment of oil and waste spills, and more particularly, to an apparatus for containing oil and waste spillage at a line connection.

Environmental protection is an important area of concern facing the world today and it is well noted that one source of pollution occurs from the leakage of oil and waste at line connections between storage tanks and removal sources. This leakage occurs at the line coupling as the oil and waste are being transferred therethrough. Furthermore, oil and waste are often spilled from the ends of these lines as they are being connected and disconnected.

This undesired source of contamination is of particular concern when it is left unresolved because it will likely cause permanent destruction of the environment. Hence, there is a need for a simple, economical and effective apparatus for containing oil and waste spillage from a line connection.

SUMMARY

The embodiment of the invention is directed to an apparatus for satisfying the need of containing oil and waste spillage at a line connection between a storage tank and a removal source.

As loading and unloading lines are being connected to one another for transferring oil and waste from a storage tank to a removal source, the oil and waste are frequently spilled out of the ends of the lines and deposited on the ground. In addition, leakage occurs from the line connection while the oil and waste are transferred therethrough. However, this undesired spillage is prevented with use of the present invention.

The embodiment of the present invention comprises an apparatus made of non-corrosive and rustproof materials, such as polyethylene or fiberglass (ie. fiber reinforced plastic), for collecting the oil and waste. The apparatus includes a container having a bottom and cooperatively upstanding sidewall, whereby the oil and waste spillage is retained inside the container as it is spilled. The upstanding sidewall terminates with an upper edge that defines the perimeter of an open top end of the container.

The container has first and second means for allowing loading and unloading lines, respectively, to be received within the container or adapted thereto. Therefore, because the lines are coupled within the container, any spillage from the ends of the lines or connection therebetween is collected and retained within the container.

In a preferred embodiment, the first and second means include the sidewall having oppositely positioned openings for receiving the ends of the lines within the container. The preferred second means for allowing the unloading line to be received within the container includes the upstanding sidewall having a U-shaped opening that is in communication with the open top end of the container. Hence, the unloading line is easily inserted and removed from the opening via the open top end of the container.

Alternatively, the first means may include the loading line being threadably coupled with a conduit that extends through the sidewall to couple with the unloading line received in the container. The alternative embodiment allows the container to be permanently attached to the end of the loading line, whereby leakage from the end of the loading line is contained when the unloading line is disconnected therefrom.

The apparatus further comprises a lid which is hingedly attached to the container and has a lip defined around its perimeter. When the unloading line is removed from the apparatus, the upper edge of the container cooperatively receives the lip therearound and enables the lid to close the open top end of the container.

An extension member is attached to the lid for closing the opening used to receive the unloading line within the container. The extension member covers the opening when the lid is closed, ie. when the lid is positioned adjacent to the sidewall for closing the open top end of the container.

The foregoing elements comprising the apparatus for containing oil and waste are preferably used in conjunction with the tank for storing the oil and waste, the loading line attached to the tank for removing the oil and waste therefrom, a shut-off valve affixed to the loading line for controlling removal of the oil and waste from the tank, the unloading line attached to the removal source for receiving the oil and waste from the loading line, and means known in the art for coupling the lines within the container.

As such, it is a first object of the embodiment of the invention to provide an apparatus which eliminates environmental pollution by containing oil and waste spillage at a loading and unloading line connection.

It is a further object of the embodiment of the invention to provide an apparatus which is simple to use and economical to produce.

It is a further object of the embodiment of the invention to provide an apparatus which contains spillage from the end of a loading line while it is disconnected from an unloading line.

It is a further object of the embodiment of the invention to provide an apparatus which resists corrosion and is rustproof.

It is a final object of the embodiment of the invention to provide a container having a cooperative lid, wherein the lid has an extension member for closing an opening used to receive an unloading line in the container.

BRIEF DESCRIPTION OF THE DRAWINGS

These and other features, aspects, and advantages of the present invention will become better understood with regard to the following description, appended claims, and accompanying drawings where:

DESCRIPTION

Figure 1A:
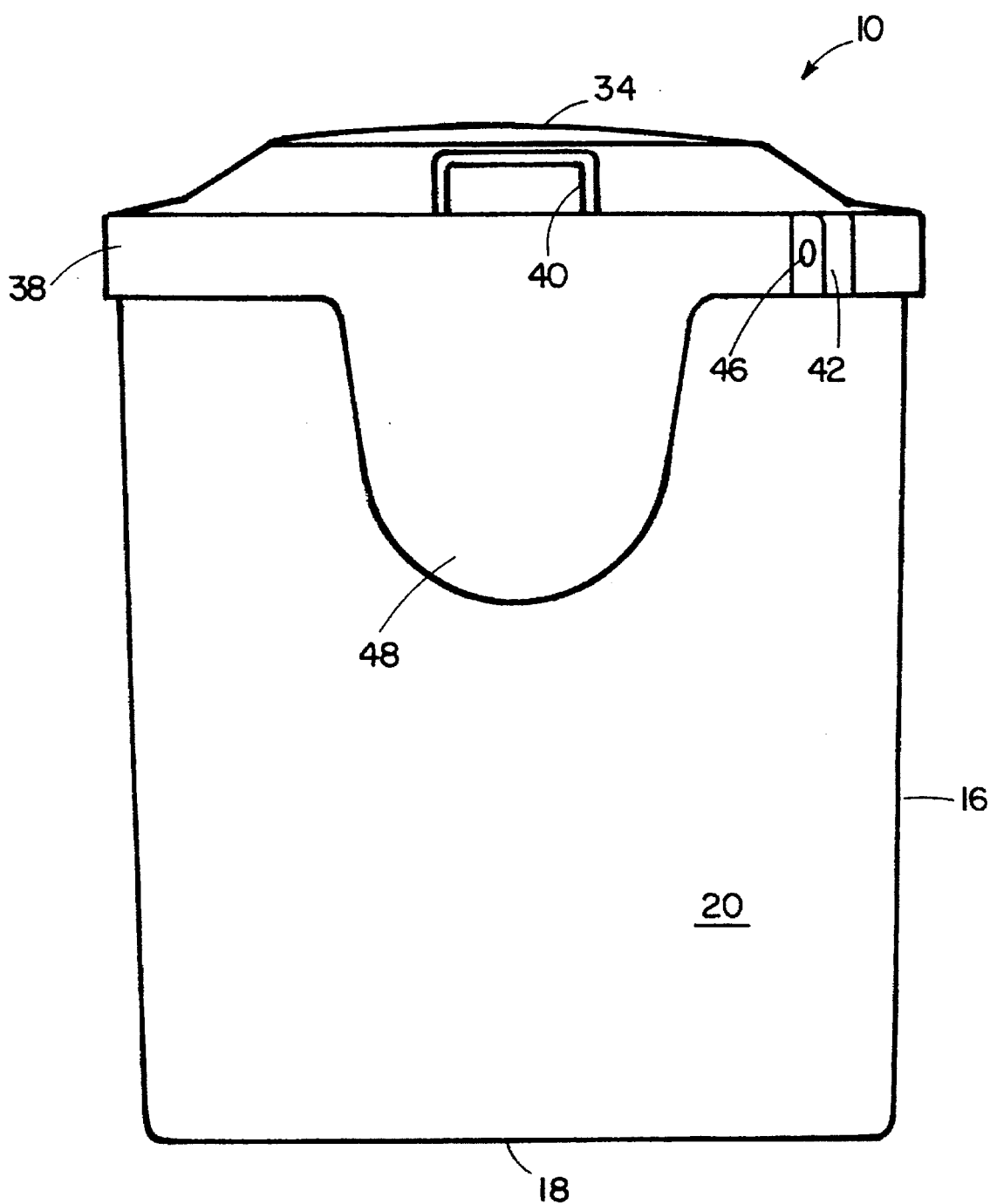
FIG. 1A is a front elevation view of a present embodiment of the apparatus for containing oil and waste spillage at a line connection, wherein the lid is closed on the container.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the appended claims.

As illustrated in FIGS. 1A–3, the present embodiment of the invention relates to an apparatus 10 which is useful in containing oil and waste spills at a loading and unloading line 12, 14 connection. Typically, the loading line 12 extends from a storage tank or the like (not shown) and the unloading line 14 extends from a removal source such as a tank truck (not shown).

The preferred version of the invention comprises an apparatus 10 made of non-corrosive and rustproof materials, such as polyethylene or fiberglass (ie. fiber reinforced plastic). The apparatus 10 includes a substantially cylindrical container 16 having a bottom 18 and cooperatively upstanding sidewall 20, whereby the oil and waste are retained An a hollow interior portion of the container 16 as they are spilled. The upstanding sidewall 20 terminates with an upper edge 22 that defines the perimeter of an open top end 24 of the container 16.

The container 16 has first and second means 26, 28, which are positioned approximately 180° apart, for allowing the loading and unloading lines 12, 14, respectively, to be received within the container or adapted thereto. The lines 12, 14 are coupled within the container using connecting means known in the art, whereby fluid communication is established between the lines 12, 14 and through the container 16. Therefore, any spillage that occurs from the lines 12, 14 while they are being connected and disconnected, as well as, when the oil and waste are being transferred therethrough is collected in the container 16.

The first and second means 26, 28 preferably include the sidewall 20 having opposed openings 30, 32, respectively, defined therethrough. The openings 30, 32 receive the ends of the respective lines 12, 14 within the container 16. Moreover, the openings 30, 32 may comprise any suitable size or shape that allows the lines 12, 14 to be received within the container 16.

More specifically, the preferred second means 28 for allowing the unloading line 14 to be received within the container 16 includes the opening 32 being U-shaped and in communication with the open top end 24 of the container 16. Hence, the unloading line 14 is easily inserted and removed from the U-shaped opening 32 via the open top end 24 of the container 16.

Alternatively, the loading line 12 is threadably coupled with a conduit (not shown) that extends through the sidewall 20, wherein the unloading line 14 is threadably coupled with the conduit inside the container 16. This alternative embodiment allows the container 16 to be permanently attached to the end of the loading line 12 and contain leakage therefrom while the unloading line 14 is disconnected.

The apparatus 10 further comprises a circular lid 34 that is hingedly attached to the container 16 with a pair of bolts 36 and which has a lip 38 defined about its perimeter. The upper edge 22 of the sidewall 20 cooperatively receives the lip 38 therearound for enabling the lid 34 to securely close the open top end 24 of the container 16 when the unloading line 14 is removed from the apparatus 10. While the preferred container 16 is cylindrical with a circular lid 34, any suitable shape of container 16 and cooperative lid 34 may be used for retaining the oil and waste.

Figure 1B:
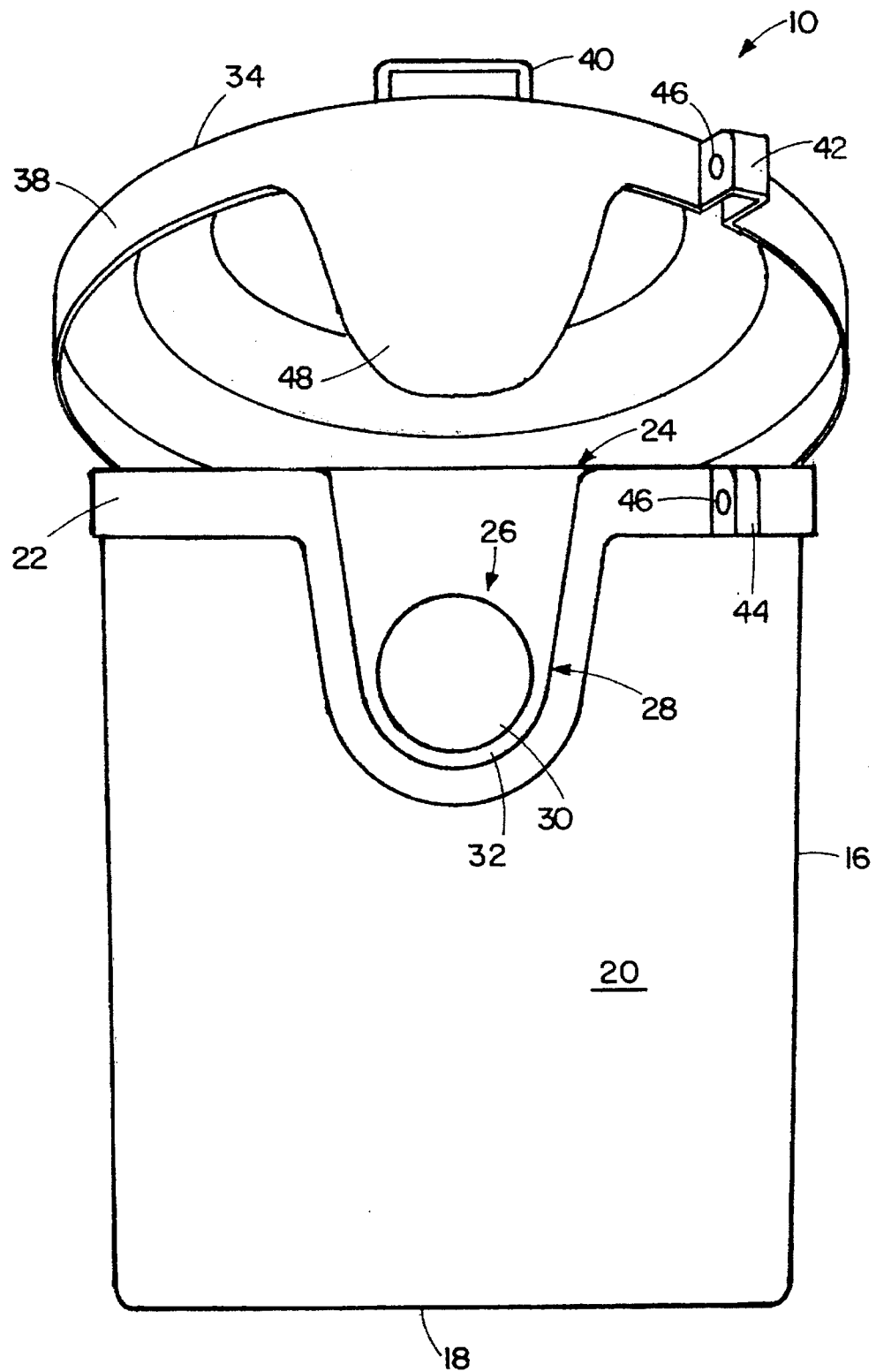
FIG. 1B is the apparatus of FIG. 1A, wherein the lid is open.
Figure 2A:
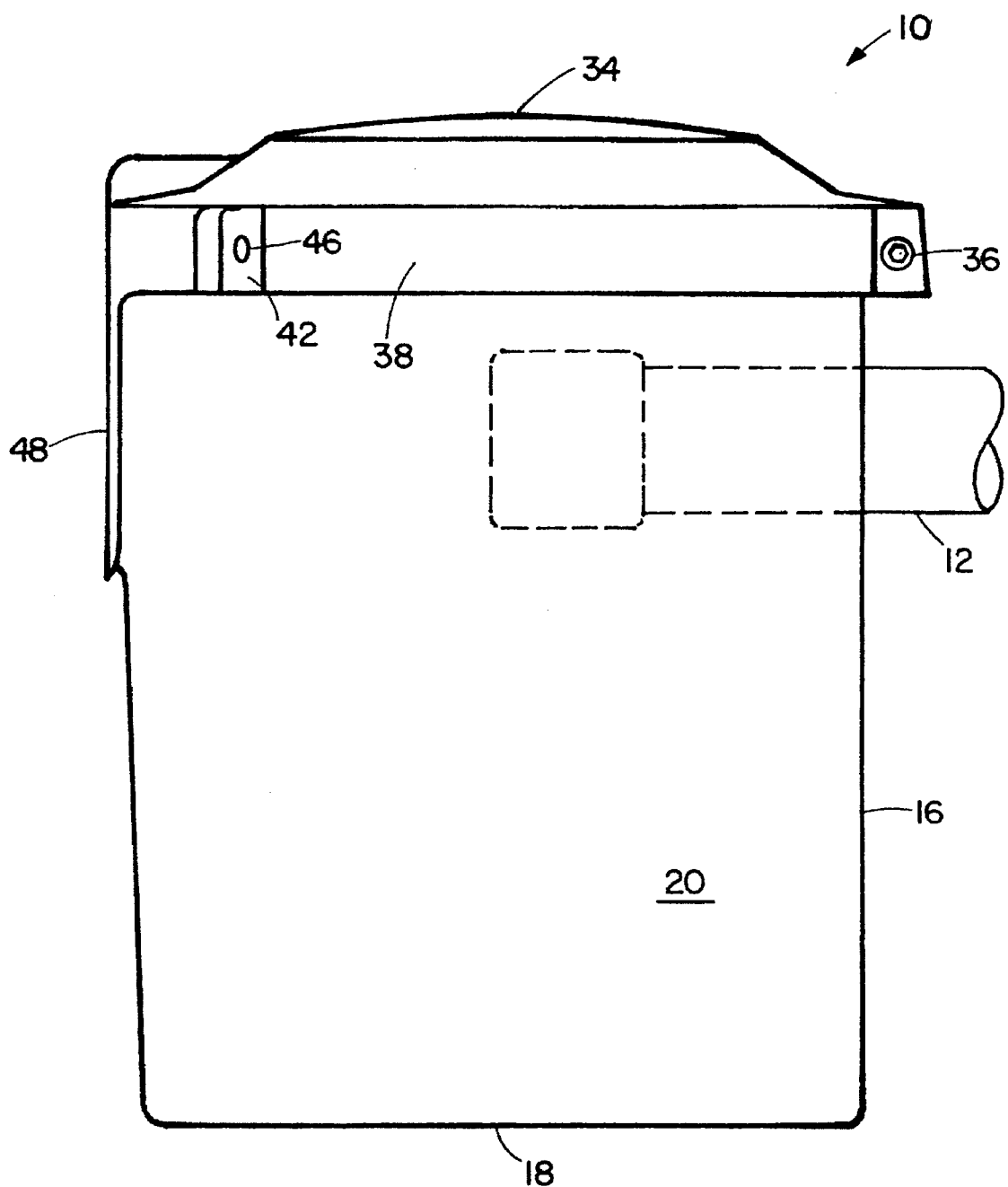
FIG. 2A is a right side elevation view of the apparatus in FIG. 1A.
Figure 2B:
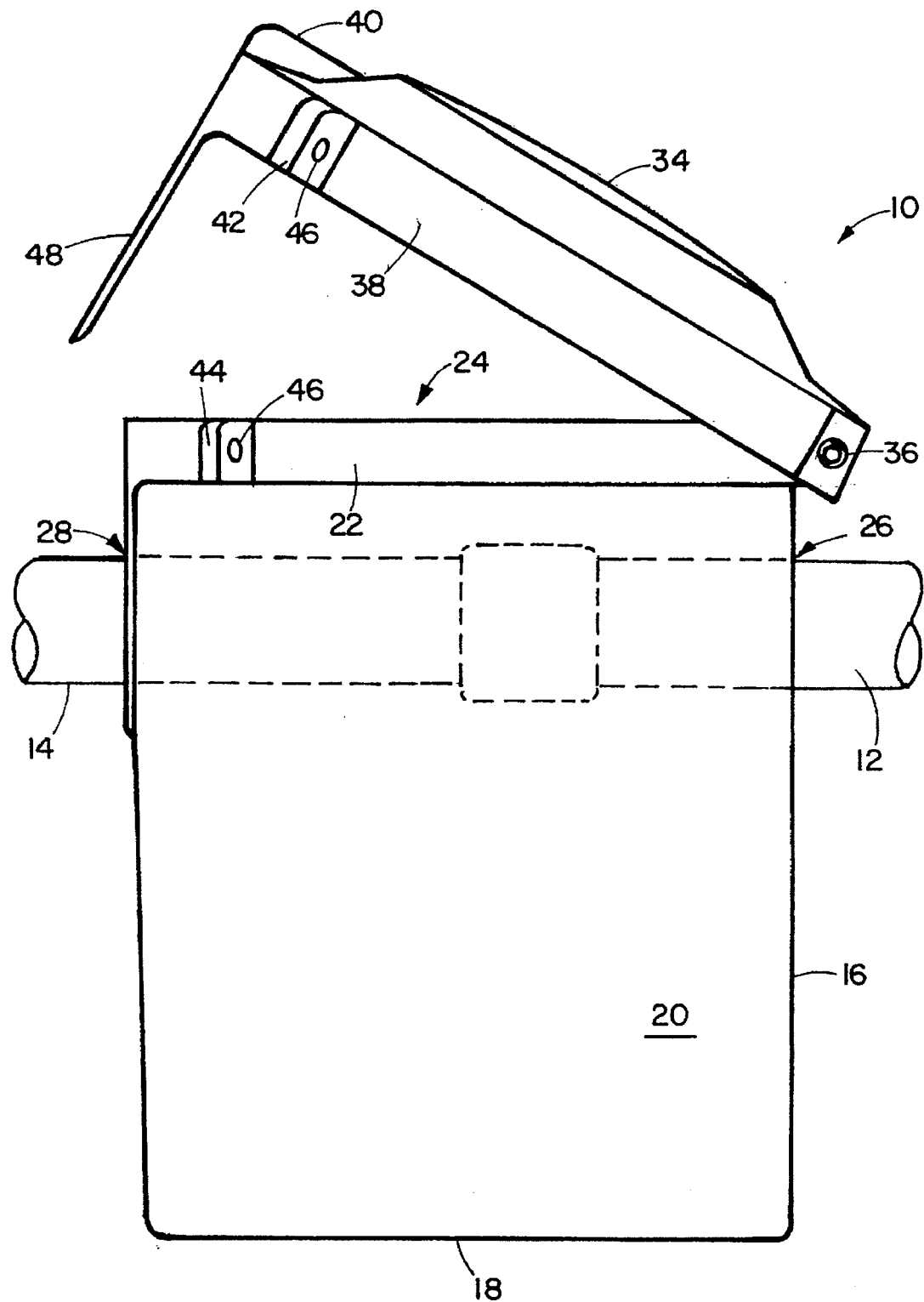
FIG. 2B is a right side elevation view of the apparatus in FIG. 1B.
Figure 3:
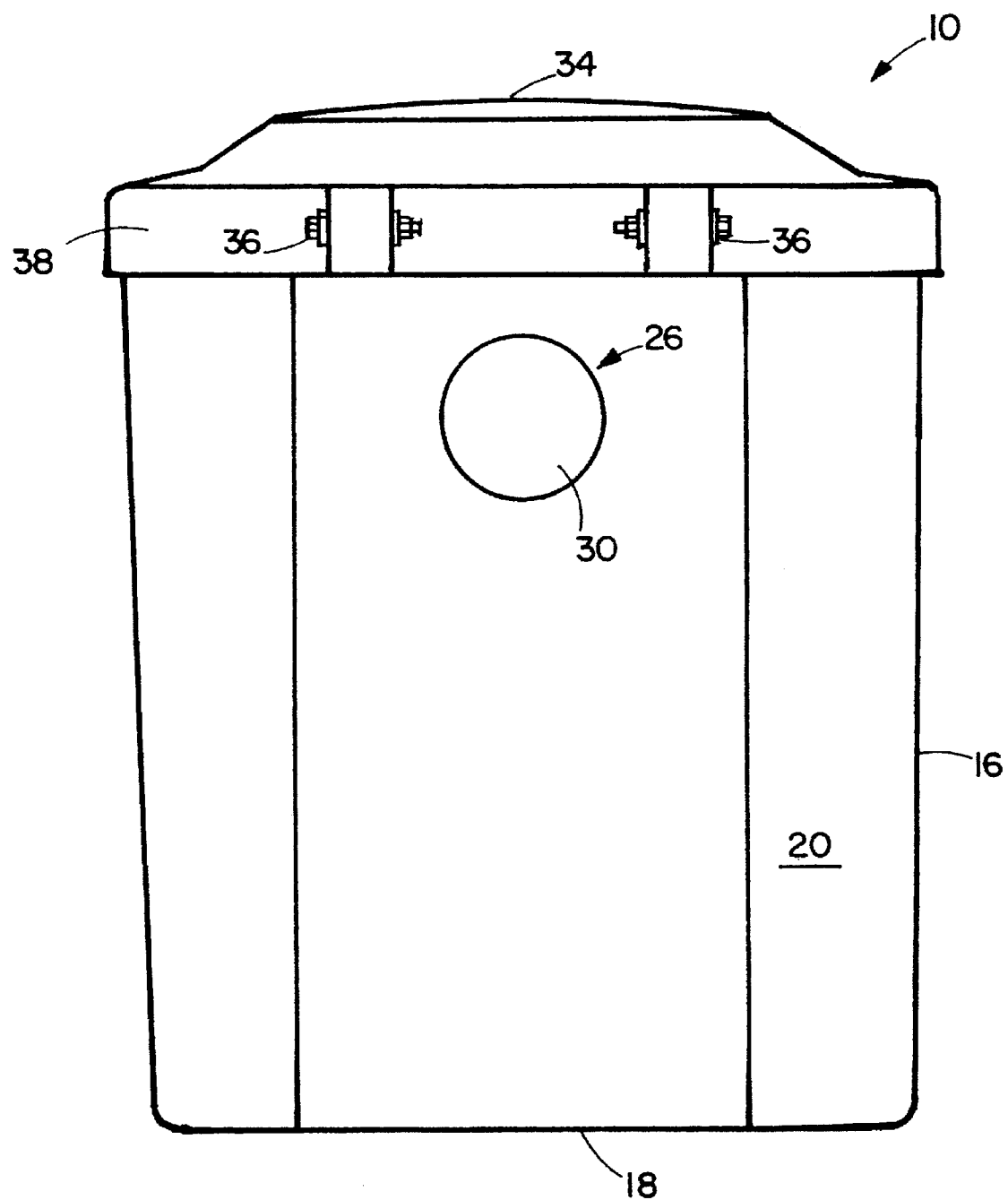
FIG. 3 is a rear elevation view of the apparatus in FIG. 1A.

The lid 34 is movable between open and closed positions by using a handle 40 that is integrally formed on the lid 34. As shown in FIG. 2B, the lid 34 must be open while the unloading line 14 is received in the apparatus 10. Thus, when the lid 34 is in the open position, as shown in FIGS. 1B and 2B, the unloading line 14 is insertable and removable from the opening 32 via the open top end 24 of the container 16. Again, the second means 28 may comprise any suitable size or configuration of opening 32 that allows the end of the unloading line 14 to be received within the container 16.

The lid 34 and upstanding sidewall 20 have first and second tabs 42, 44, respectively, attached thereto. Each tab 42, 44 has a hole 46 defined therethrough, wherein the tabs 42, 44 and holes 46 are adjacently positioned when the lid 34 is closed on the container 16. A hasp of a locking device (not shown) may be received through the holes 46 when the tabs 42, 44 are adjacently positioned and the holes 46 are aligned; thus, enabling the apparatus 10 to be locked in the closed position.

In addition, an extension member 48 is attached to the lid 34 for closing the opening 32 used for receiving the unloading line 14 within the container 16. As shown in FIGS. 1A and 2A, the extension member 48 covers the opening 32 when the lid 34 is closed over the open top end 24 of the container 16. The member 48 preferably extends from the lip 38 and is of a U-shaped size that will completely cover the preferred opening 32. Nevertheless, the extension member 48 may comprise any size or configuration which suitably covers the opening 32.

The foregoing elements comprising the apparatus 10 for containing oil and waste are preferably used in conjunction with the tank for storing oil and waste, the loading line 12 attached to the tank for removing the oil and waste therefrom, a shut-off valve (not shown) affixed to the loading line for controlling removal of oil and waste from the tank, the unloading line attached to the removal source for receiving oil and waste from the loading line, and the means known in the art for coupling the lines within the container.

The previously described embodiments of the invention have many advantages, including a simple and economic way of containing fluid spillage from a loading and unloading line connection. Another advantage of the embodiment of the invention is that the unloading line 14 is quickly inserted and removed from the sidewall 20 of the apparatus 10. Yet, another advantage of the present invention is that the lid 34 includes the extension member 48, whereby the opening 32 for receiving the unloading line 14 is effectively covered when the lid 34 is closed over the open top end 24 of the container 16.

The preferred use of the present version of the invention is for an oil and waste loading and unloading line connection; however, it is obvious that the apparatus 10 has many applications for containing various spillage, such as oil, waste or chemicals, at numerous types of line connections. Therefore, the foregoing descriptions of specific embodiments of the present invention have been presented for purposes of illustration and description. They are not intended to be exhaustive or to limit the invention to the precise forms disclosed and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for containing spillage at a line connection, the apparatus comprising:

a container having a bottom and an upstanding sidewall whereby the spillage is retained in said container as it is spilled, said container having an open top end;

wherein the apparatus includes a first means for receiving a loading line;

wherein said upstanding sidewall includes a second means for receiving an unloading line;

a lid for closing said open top end of said container when the unloading line is removed from the apparatus; and means for closing said second means when the unloading line is removed from the apparatus, said means for closing is attached to said lid.

2. The apparatus of claim 1 wherein said second means includes said sidewall having an opening defined therethrough, said opening is in communication with said open top end of said container.

3. The apparatus of claim 2 wherein said opening is generally U-shaped.

4. The apparatus of claim 1 wherein said means for closing includes an extension member.

5. The apparatus of claim 4 wherein said extension member is generally U-shaped.

6. The apparatus of claim 4 wherein said extension member extends from a lip defined on said lid.

7. The apparatus of claim 1 wherein said means for closing is attached to a lip defined on said lid.

8. The apparatus of claim 7 wherein said lip is cooperatively received around an upper top edge of said upstanding sidewall when said lid is closed on said container.

9. The apparatus of claim 1 wherein the apparatus includes means for hingedly attaching said lid to said container.

10. The apparatus of claim 9 wherein said means for attaching said lid to said container is located on a portion of said sidewall that is generally opposite said second means for receiving the unloading line.

11. An apparatus for containing spillage at a line connection, the apparatus comprising:

a container having a bottom and an upstanding sidewall whereby the spillage is retained in said container as it is spilled, said container having an open top end;

wherein the apparatus includes means for receiving a loading line;

wherein said upstanding sidewall includes having an opening defined therethrough for receiving an unloading line;

a lid for closing said open top end of said container when the unloading line is removed from the apparatus; and an extension member attached to said lid for covering said opening when the unloading line is removed from the apparatus and said lid is closed on said container.

12. The apparatus of claim 11 wherein said opening is in communication with said open top end of said container.

13. The apparatus of claim 11 wherein said opening is generally U-shaped.

14. The apparatus of claim 11 wherein said extension member is generally U-shaped.

15. The apparatus of claim 11 wherein said extension member extends from a lip defined on said lid.

16. The apparatus of claim 15 wherein said lip is cooperatively received around an upper top edge of said upstanding sidewall when said lid is closed on said container.

17. An apparatus for containing spillage at a line connection, the apparatus comprising:

a container having a bottom and an upstanding sidewall whereby the spillage is retained in said container as it is spilled, said container having an open top end;

wherein the apparatus includes means for receiving a loading line;

wherein said upstanding sidewall includes having a generally U-shaped opening defined therethrough for receiving an unloading line, said opening is in communication with said open top end of said container;

a lid for closing said open top end of said container when the unloading line is removed from the apparatus; and an extension member attached to said lid for covering said opening when the unloading line is removed from the apparatus and said lid is closed on said container.

18. The apparatus of claim 17 wherein said extension member is generally U-shaped.

19. The apparatus of claim 17 wherein said extension member extends from a lip defined on said lid.

20. The apparatus of claim 19 wherein said lip is cooperatively received around an upper top edge of said upstanding sidewall when said lid is closed on said container.

* * * * *